(12) United States Patent
Sklyarevich et al.

(10) Patent No.: US 11,697,273 B2
(45) Date of Patent: Jul. 11, 2023

(54) METHOD OF AUTOCLAVE-FREE LAMINATING

(71) Applicant: Gyrotron Technology, Inc., Bensalem, PA (US)

(72) Inventors: Vladislav Sklyarevich, Bensalem, PA (US); Mykhaylo Shevelev, Huntington Valley, PA (US)

(73) Assignee: Gyrotron Technology, Inc., Bensalem, PA (US)

( * ) Notice: Subject to any disclaimer, the term of this patent is extended or adjusted under 35 U.S.C. 154(b) by 0 days.

(21) Appl. No.: 17/611,952

(22) PCT Filed: May 23, 2019

(86) PCT No.: PCT/US2019/033821
§ 371 (c)(1),
(2) Date: Nov. 17, 2021

(87) PCT Pub. No.: WO2020/236185
PCT Pub. Date: Nov. 26, 2020

(65) Prior Publication Data
US 2022/0314592 A1  Oct. 6, 2022

(51) Int. Cl.
| | | |
|---|---|---|
| B32B 17/10 | (2006.01) | |
| B32B 37/02 | (2006.01) | |
| B32B 37/06 | (2006.01) | |
| B32B 37/16 | (2006.01) | |

(52) U.S. Cl.
CPC ........ *B32B 17/10972* (2013.01); *B32B 17/10* (2013.01); *B32B 17/10036* (2013.01); *B32B 17/10055* (2013.01); *B32B 17/10761* (2013.01); *B32B 17/10935* (2013.01); *B32B 37/02* (2013.01); *B32B 37/06* (2013.01); *B32B 37/16* (2013.01); *B32B 2255/00* (2013.01); *B32B 2309/68* (2013.01); *B32B 2457/12* (2013.01)

(58) Field of Classification Search
CPC ........ B32B 17/10871; B32B 17/10972; B32B 17/1099; B32B 17/10036; B32B 17/10935; B32B 17/10816; B32B 37/02; B32B 37/06; B32B 37/08; B32B 37/16; B32B 2255/00; B32B 2309/68; B32B 2457/12; B29C 65/1429; B29C 65/1435; B29C 65/1438; B29C 65/1445
USPC ............ 156/99, 104, 106, 109, 272.2, 380.9
See application file for complete search history.

(56) References Cited

U.S. PATENT DOCUMENTS

| | | | |
|---|---|---|---|
| 5,536,347 A * | 7/1996 | Moran ............... | B32B 17/10816 156/103 |
| 2007/0034317 A1* | 2/2007 | Sklyarevich ............ | B32B 37/06 156/380.9 |

\* cited by examiner

*Primary Examiner* — John L Goff, II
(74) *Attorney, Agent, or Firm* — Carothers and Carothers

(57) ABSTRACT

A method for laminating an assembled sandwich structure consisting of a functional part (4) and one glass article (5) separated from an outer surface of the functional part by a laminating film (6) by heating with electromagnetic radiation in a vacuum is described. In the method equal temperatures of all sandwich components are provided by selection of the optimal radiation frequencies. The optimal vacuum level is provided following the laminating film temperature.

17 Claims, 3 Drawing Sheets

METHOD OF AUTOCLAVE-FREE LAMINATING

BACKGROUND OF THE INVENTION

1. Field of the Invention

The present invention relates to a method for laminating glass articles and other fragile materials, with functional part/s.

Flat or non-flat glass articles, VIG (vacuum Insulated glass) and other sensitive to pressure products can be laminated in accordance with the teachings of the present invention.

2. Discussion of the Prior Art

Laminates provide a way of strengthening frangible material, for example glass, so as to extend its uses and to render it safer to use in certain circumstances. Thus laminated glass products can be used for automotive and aircraft glazing, glass doors, balustrades, bulletproofing and many other uses where the glass product must be strong and/or shatterproof.

In conventional laminated glass products a sheet of glass is bonded to a layer of polymer adhesive film, and a further sheet or layer of material is bonded to the other side of the adhesive film layer, so that the adhesive film is sandwiched between two outer layers. If the glass sheet is then struck a blow it cracks or breaks, but does not shatter into small hazardous sharp pieces as the broken pieces are still bonded to and held in place by the polymer layer. If the laminated glass is used in a car windscreen, occupants of the car are therefore not showered with broken glass upon breakage of the windscreen.

A number of methods for producing such laminates have been disclosed. For example, see U.S. Pat. Nos. 5,268,049; 5,118,371; 4,724,023; 4,234,533; and 4,125,669. Laminated glass has been generally manufactured by a process wherein a stack of at least two sheets of glass having a plastic film called an intermediate film or laminating film, typically a plasticized polyvinyl butyrlal (PVB) film, is sandwiched between each pair of adjacent sheets of glass which is subjected to evacuation, pressing and heating.

Usually this involves long heating at temperatures of around 80° C.-140° C. and high pressure, 4 MPa-20 MPa. The main problem encountered is that air is trapped between the film and glass surfaces, which air must be removed. This is required to prevent the laminate from bubbling. Removing the remainder of the air requires long heating and high pressure. The bubbling is a visible and objectionable defect that in most cases is absolutely unacceptable. Besides, bubbling within the laminate may reduce its strength in this area and cause de-lamination.

At the same time removing air is not an easy task because it is trapped between both sides of the plastic film and a glass sheet and there are only two mechanisms by which the air can escape: diffusion and dissolving in the film. Both processes are very slow, requiring long term heating and the application of high pressure. The bigger the glass sheet, the longer the time required. An especially long time is required for making multi-layer laminates. As a result, the productivity of such processes is low and they require considerable capital expenditure to set up the necessary costly apparatus, such as autoclaves.

Many prior art patents focus on the solution of problems related to the air escaping. In U.S. Pat. No. 5,268,049, glass sheets are spaced apart, and in the method described by U.S. Pat. No. 5,268,049, a liquid resin is used. In U.S. Pat. No. 4,234,533 the two sheets are held at an angle and in U.S. Pat. No. 5,118,371 the thickness of PVB gradually increases (or decreases) from the one side to the other side of the glass sheets. In U.S. Pat. No. 3,509,015 a method is described for producing laminated glass by sealing the periphery of two parallel glass sheets with pressure sensitive tape and forcing resinous material under pressure into the inter-sheet space. The resinous material is forced through a self-closing valve held in place with the tape while trapped air escapes through an aperture in the taped seam at the top of the cell. U.S. Pat. No. 4,125,669 describes a similar method in which two glass panes are sealed all around except for a fill opening and an aeration opening, and a binder material is introduced into the envelope thus formed in an amount calculated to exactly fill the envelope. Putty is applied to the openings just before emergence of the binder upon laying the filled envelope flat.

U.S. Pat. No. 3,315,035 describes a method involving the maintaining of the glass sheets in opposite relationship, heating the sheets to about 200° F. and injecting a resin composition containing a hardening agent, preheated to about 200° F., into the inter-sheet space and curing the assembled article. In U.S. Pat. No. 4,234,533 the seal around the sheets is formed by a gas-permeable, resin-impermeable material such as "Scotchmount"™. In some inventions (see for example U.S. Pat. Nos. 4,828,598 and 4,724,023) the laminating process is conducted in a vacuum. The vacuum environment helps air to escape and, in general, can reduce the level of trapped air. However, heating in a vacuum is always difficult, inefficient and therefore the laminating process still requires a long time. One more example is a method that was described in United States Patent Application Publication No. 2003/0148114. Total processing time was indicated as dozens of minutes. In addition, this method works only with special and expensive plastic material that has a moisture content below 0.35 percent.

A vacuum for de-airing is used in U.S. Pat. No. 6,340,045 as well. The heating and pressing processes are conducted in separate chambers that make the laminating quality unsatisfactory because of possible PVB shrinkage (nothing prevents this) and, what is more important, because nothing helps the PVB to flow during heating. Rapid cooling and doing this without pressure makes the achievement of good laminates very questionable. In the patent " . . . electrical (irradiative) heating elements . . . or convective heating" were used for heating in the chamber that is under vacuum. Heating in a vacuum by "convective heating" is impossible and heating by electrical elements in a vacuum without specifying the temperature of this heater is very insufficient. The described apparatus is long (at least five lengths of the glass being processed: two locks, heating chamber, pressing chamber, cooling site) and quite complex. All the above described methods of air bubble removal, are not fully effective and are complicated, very sensitive to moisture inside and outside the film. The apparatuses are massive and ineffective and still, in most cases, require long term heating (high energy consumption) and special expensive equipment, such as high pressure autoclaves.

There is the method described in U.S. Pat. No. 7,476,284 that is free from the above mentioned problems and is provided for laminating glass sheets and other frangible material rapidly and does not require the use of autoclave type furnaces. However, this method does not provide qualitative laminating in the case wherein the assembled sandwich structure consists of thick glass sheets, sheets of different thicknesses, and a functional part such as VIG, solar, bullet proof inserts, etc. The main problem here is that the method is not able to apply and control the heating from both sides correspondent to the different thicknesses, existence of non-symmetric inserts, VIG, etc. As a result of said non symmetrical property of the sandwich the different glass parts are heated to different temperatures and results in different thermal extensions. For a rectangular glass sheet this alters a flat sheet to a "spoon" shape during the heating (1, see FIG. 1). The opposite glass (2) also bends but in the opposite direction making gap (3) between sheets, especially on the corners. It is clear that this gap will create problems for adhesion of the film. Further. said method maintains a high level of vacuum during the entire heating process. This results in the boiling of liquids presented in laminating films or formed there during the heating towards the end of the process (generally as the temperature rises over 80° C.). The steam from this evaporation cannot escape due to the film sticking to the glass and may create hollow spaces that impacts laminating quality.

At the same time more solar modules need to be laminated, as well as VIG. Extremely large numbers of bulletproof windshields, windows and other laminate products are made each year. Accordingly, there is a clear need in the art for a more effective and less expensive method for laminating glass sheets for a wide variety of glass products.

SUMMARY OF THE INVENTION

According to the present invention, a method is provided for laminating glass structures and other frangible material with the thermal treatment of a laminating film that can be processed by fast and controlled heating without use of autoclave type furnaces. Products prepared using the method of the present invention include, but are not limited to, architectural glass, glass doors, balustrades, bulletproof glass, windshields, side windows and rear windows for vehicles such as automobiles and the like, VIG, solar and like, as well as many other uses where the glass product must be strong. The inventive method utilizes electromagnetic radiation to rapidly apply heat in a vacuum to the adhesive film to be thermally treated.

The invented method comprises the assembly of a sandwich structure consisting of a functional part and one glass article separated from the outer surface of the part by a laminating film, comprised of pre-laminating and final bonding of the film to the part and glass article, wherein each is conducted in a vacuum by using electromagnetic radiations from both sides of the sandwich. The radiation from the glass article side has a wavelength that provides penetration through the glass article, the film and a fraction of the correspondent side of the functional part, and applying radiation from the functional part side that has a wavelength that provides penetration greater than or equal to the thickness of a fraction of the second side of the functional part. In the present invention the radiation power selection is provided by adjusting the duty cycle and selection of wavelength, obtained by varying filament temperature or by varying heater types such as from sealed tungsten filament quartz lamps, metal wire heating elements, ceramic heaters, and the like. The preferable wavelengths for the method of the present invention is between 1 and 5 microns The radiation powers are selected and controlled during the heating such that an equal temperature for both surfaces of the functional part and glass article during heating is provided. The minimal vacuum level (preferably better than 15 kPa) is selected such that the boiling point of water in the film, that is correspondent to said vacuum level, is lower than the temperature at which the film sticks to the adjacent glass article and the part. While the film temperature rises to a final bonding temperature level, the minimal vacuum level is correspondingly decreased to prevent the boiling of liquid components, other than water, which are contained in the film. The final bonding temperature is selected to a level at which an appropriate adhesion between said part outer surface, laminating film, and said glass articles is obtained after cooling. Cooling is provided until said sandwich temperature reduces to a selected safe level.

The present invention is generally applicable if the functional part is a solar unit, vacuum insulated unit (VIG), a polycarbonate sheet, a glass sheet, including with low-E coating on one surface, a multi-glass article structure, a glass sheet with thickness different than that of the glass article, or the like In the embodiments of the invention discussed above the pre-laminating and final bonding are conducted in separate chambers and the final bonding is performed by convectional heat sources under normal pressure. The heat is applied to both sides of the sandwich independently and controllably. To prevent a penetration of atmospheric air inside the sandwich after it moves for final bonding from the vacuum chamber, the temperature at the end of the pre-laminating process is sufficient for a correspondent adhesion. The preferable level of said adhesion was determined to be around 1000 N/mm2. The final bonding is conducted by independently heating the sandwich to a temperature at which an appropriate adhesion between the laminating film and the glass articles is obtained after cooling. The heating powers are selected and controlled such that the equal temperature of both glass articles is provided continuously during the entire final bonding process.

Referring to FIG. 4, an apparatus for realization of the method of the present invention is comprised of vacuum (7) and cooling (16) chambers. These chambers have in and out conveyors (14) and (17) for conveying the structure into the chambers and conveying the structure out of the chambers, as well as, oscillating the structure. For heating the sandwich a set of electromagnetic radiation emitters (13) selected from sealed tungsten filament quartz lamps, metal wire heating elements, ceramic heaters, and the like with a correspondent set of power controllers (15) installed that provide heating for the sandwich from both top and bottom sides independently and controllably to a predetermined bonding temperature for selected adhesion with equal temperature during the heating, the controller activating and controlling the emitters individually. The bottom emitters are fixed between rollers.

A cooling chamber (16) includes a conveyor (17) for conveying the structure through and from the vacuum chamber, as well as oscillating the structure, a source of pressure air (18) that is applied from both sides of the sandwich from compressors (20) and/or blowers or fans as a cooling controller (19) that provide equal temperature reduction during the cooling of the sandwich to a selected level (usual safe temperature level of around 70 C). The cooling controller (19) is selected from air flow controllers, valves, and the like.

In embodiments of the present invention wherein the final bonding is conducted in separate heating furnaces at normal pressure, the furnace has a conveyor for conveying the structure from the vacuum chamber and conveying the structure out of the furnace, as well as, oscillating the structure, and a set of nozzles blowing hot gaseous matter, that provide heating of the sandwich from both sides independently and controllably to a predetermined bonding temperature for selected adhesion with equal temperatures during the heating.

The main advantages of this autoclave free method are reduction of manufacturing costs and increase of production rate. Many other specific advantages also exist including but not limited to the possibility of laminating pressure sensitive glass products that cannot withstand traditional autoclave laminating processes. Further, certain products, such as VIG and some solar related products, cannot be laminated with PVB other than by using the present invention.

BRIEF DESCRIPTION OF THE DRAWINGS

Other objects and advantages appear hereinafter in the following description and claims. The accompanying drawings show, for the purpose of exemplification, without limiting the scope of the invention or appended claims, certain practical embodiments of the present invention wherein:

DETAILED DESCRIPTION OF THE PREFERRED EMBODIMENTS

The present invention relates to a method for laminating glass structures and other frangible material with the thermal treatment of a laminating film that can be processed by fast controlled heating without the required use of autoclave type furnaces. Products prepared using the method of the present invention include, but are not limited to VIG, solar panels, bulletproof, balustrades, and other safety glass, and like, also, architectural and vehicle glass, as well as, many other uses where the glass product must be strong. The present invention is generally applicable if the glass sheets have different thickness and have a low-E coating on the adjacent film surface. A multi-glass article structure can be also made by the method of the present invention.

Figure 1:
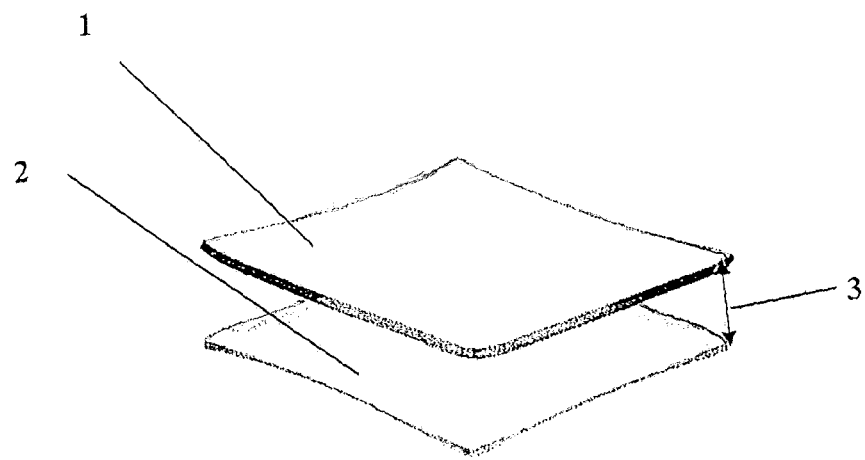
FIG. 1 is an isometric schematic view that illustrates prior art problems in laminating an asymmetrical sandwich.
Figure 2:
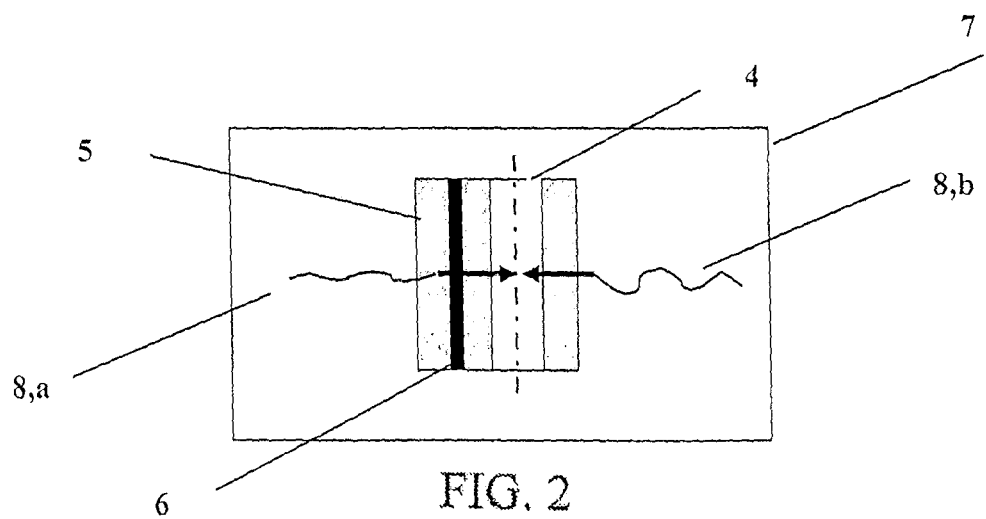
FIG. 2 is a schematic view in cross section of the laminate that illustrates a concept of the present invention.

The invented method comprises the assembly of a sandwich structure consisting of a functional part (4) (for example VIG) and one glass article (5) separated from the outer surface of the part (4) by a laminating film (6) (see FIG. 2), comprised by bonding of the film (6) to the part (4) and glass article (5), that is conducted in a vacuum chamber (7) by using electromagnetic radiations (8*a,b*) respectively from both top and bottom sides of the sandwich.

Figure 3:
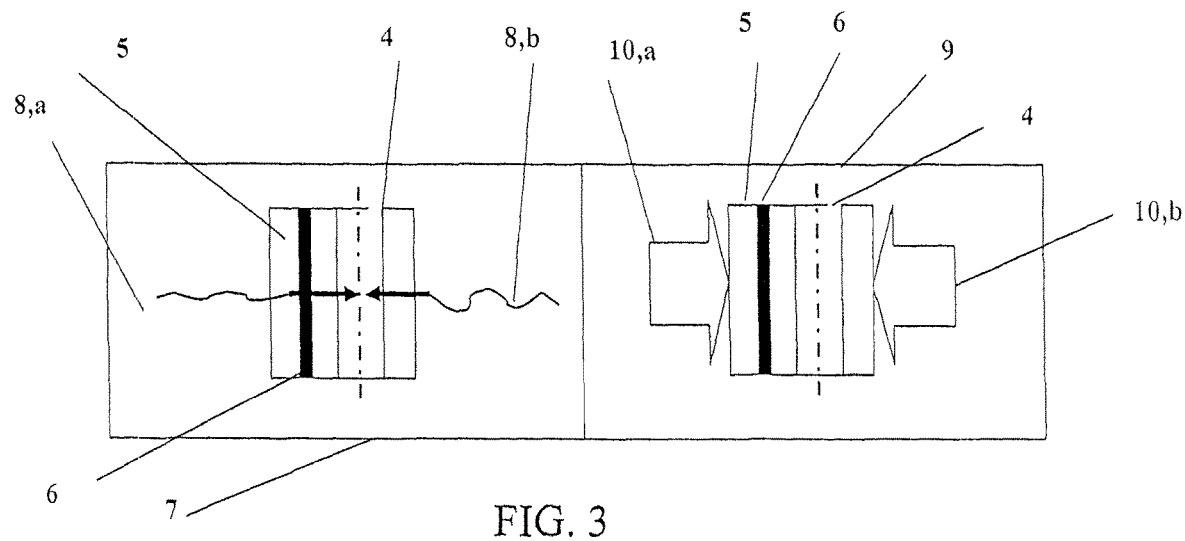
FIG. 3 is a schematic view in cross section of the laminate that illustrates a concept of the embodiments of the present invention wherein the pre-laminating and final bonding are conducted in separate chambers.

The radiation (8,*a*) from the glass article (5) first side has a wavelength selected such that it provides penetration through the glass article, the film and a fraction of the part (4) (see FIG. 3), that is half of the part. The radiation (8,*b*) from the second side of the part (4) has a wavelength that provides penetration greater or equal to the fraction of the part that is the second half of the part.

In the present invention selection of the radiation wavelengths is provided by varying filament temperature or by varying heater types such as selecting from sealed tungsten filament quartz lamps, metal wire heating elements, ceramic heaters, and the like. The preferable wavelengths in the present invention are between 1 and 5 microns.

The radiation powers are selected and controlled during the heating such that equal temperatures of both surfaces of the functional part and glass article during heating are provided.

The minimal vacuum level is selected such that the boiling point of water in the film that is correspondent to the vacuum level is lower than the temperature at which the film sticks to the adjacent glass article and the part. Under these conditions the air and moisture that was captured in between the film, glass articles and the part, as well in the film, can be pumped out while spaces between the adjacent glass article and the part exist.

In the present invention the preferable vacuum level is around 15 kPa and is predetermined to be at the water boiling temperature, that is around 50° C. Most thermoplastic adhesion films such as PVB, TPU, and like are still not sticky at this temperature.

The final bonding temperature is selected at a level which appropriate adhesions between the part outer surface, laminating film, and the glass articles are obtained after cooling.

In the present invention the cooling of the sandwich is conducted from both sides whereby equal temperatures of both surfaces of the functional part are provided during the entire cooling process.

In the embodiments of the invention discussed above the pre-laminating and final bonding is conducted in separate chambers. The pre-laminating is conducted in vacuum chamber (7) (see FIG. 3) and the final bonding is performed under normal pressure in a separate furnace (9). The heat is applied to both sides of the sandwich independently and controllably as indicated at (10*a*) and (10*b*) until the predetermined adhesions between laminating film (6) glass articles (5) and the part (4) are obtained after cooling. The heating powers are selected and controlled such that equal temperatures of all pieces of the sandwich are provided continuously during the entire final bonding process.

In the embodiments of the invention discussed above, electromagnetic radiation or hot air or a combination of them are used.

To prevent penetration of atmospheric air inside the sandwich when it moves from the vacuum chamber to the hot air furnace, the temperature at the end of pre-laminating process is selected to be sufficient for a correspondent adhesion. The preferable level of this adhesion is determined to be around 1000 N/mm2.

Figure 4:
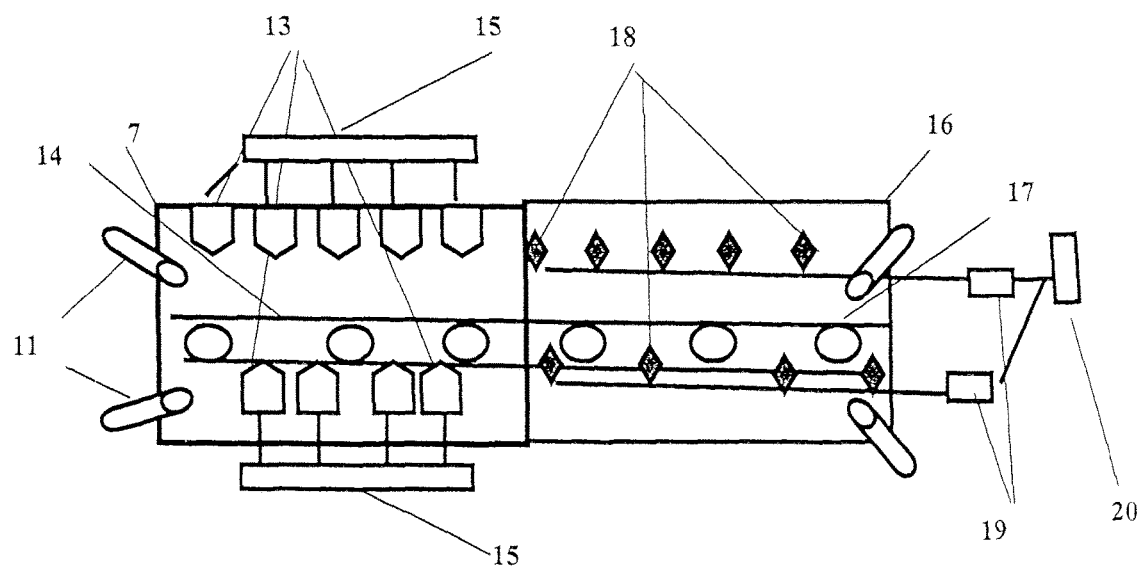
FIG. 4 is a schematic representation in side elevation of an apparatus for carrying out the method of the present invention for laminating glass articles.

An apparatus for lamination according to the present invention is comprised of vacuum chamber (7) and a cooling chamber (16) (see FIG. 4) with roller conveyors (14) and (17) for positioning the structure and moving it through the apparatus as well as for oscillating the structure inside each processing site.

The vacuum chamber (7) has electromagnetic radiation emitters (13) from both top and bottom sides of the structure. The bottom emitters (13) are located between rollers of conveyer (14). The emitters are connected to controllers (15) that independently switch the emitters (13) on and off and independently control the power of the radiation to provide equal temperatures of outer surfaces of the part to a predetermined bonding temperature for selected adhesion during the heating. The temperatures were measured by pyrometers (11). The electromagnetic radiation emitters are selected from sealed tungsten filament quartz lamps, metal wire heating elements, ceramic heaters, and the like or a combination of them.

A cooling chamber (16) is provided with a conveyor (17) for conveying the structure from the vacuum chamber (11), as well as oscillating the structure, sources of pressure air (18) that applies air pressure from both sides of the sandwich and cooling controller (19) that provides equal temperature reduction during the cooling of the sandwich to a selected level. The cooling controller (19) is selected from air flow controllers, valves, and the like. The air pressure source air (18) is provided from a compressor (20), or by a set of blowers.

Figure 5:
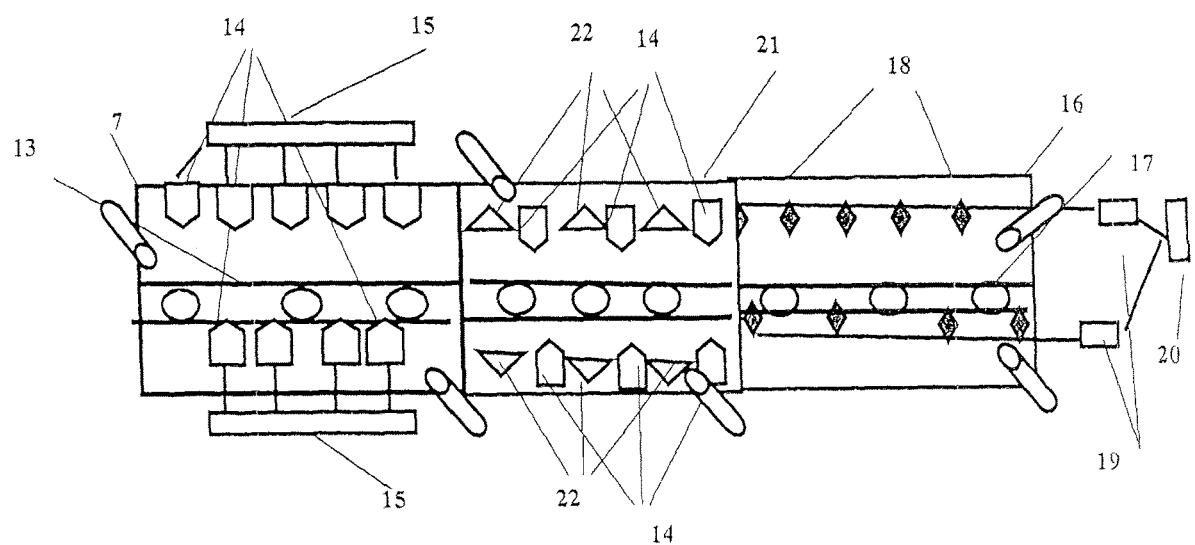
FIG. 5 is a schematic representation in side elevation of an apparatus for performing the method of the present invention wherein the pre-laminating and final bonding are conducted in separate chambers.

In the embodiments of the invention discussed above the final bonding is conducted in a separate furnace (21) (see FIG. 5). The heat sources are a set of nozzles (22) blowing hot gaseous matter or radiation emitters (14), as well as a combination of them to heat the sandwich from both top and bottom sides.

The invented method ensures reduction of manufacturing costs and an increase in production rate. Many other specific advantages also exist including but not limited to increasing production yield and the opportunity for producing a high quality laminate. The invention was tested by laminating a vacuum insulated glass (VIG) and a glass sample with different thicknesses.

A VIG panel 20"×30" was laminated from one side. A soda-lime glass article of the same size and thickness (⅛") was attached to the VIG through 0.76 mm PVB film. The assembled sandwich was placed in the vacuum chamber with a vacuum of 15 kPa and irradiated by infrared lamps. Irradiation with a wavelength of around 2.2 microns was used from the glass article side. The use of this wavelength guaranteed penetration through the article, film and the adjacent glass of VIG. A radiation of 3 microns was applied from the opposite VIG side to heat the second side of the VIG glass. The temperatures from the both sides of the sandwich were measured by correspondent pyrometers. Equal temperatures were maintained from both sides by changing duty cycles of the radiations that were applied from each side independently by using 8 phase angle power controllers. The pressure raised to 30 kPa after the temperature reached 80° C. and then around 55 kPa.

The sample successfully passed vacuum testing. The VIG seal was not destroyed. The article was laminated without defects.

The method described of the present invention was tested for laminating a 38"×25" soda lime glass article of half inch thickness to the same size glass sheet which was a quarter inch thick with PVB film of 0.76 mm thickness. The assembled sandwich was placed in the vacuum chamber with a vacuum of 15 kPa and irradiated by infrared lamps. Irradiation with a wavelength of around 1.6 microns was performed from the glass article side. The use of this wavelength was correspondent to the necessary penetration through the article and at least half the film thickness. A radiation of 2.2 microns was applied from the opposite side. The temperatures from both sides of the sandwich were measured by correspondent pyrometers and equal temperatures were maintained from both sides in the same way as in the previous VIG test. The sandwich was laminated without defects and successfully passed boiling and pummel tests. The pressure was changed at the same pace as in the previous test.

Additionally, it was discovered that each film has a liquid chemistry, beside the inclusion of water, which under particular temperatures and vacuum levels can create intensive evaporates, thereby causing many problems and imperfections, such as disturbing the adhesion formation, change in film properties, etc. The boiling point temperature of liquids deceases with an increase in the vacuum level. To prevent this, it is very helpful to increase the minimal vacuum pressure in the vacuum chamber while the temperature rises toward the bonding temperature. Of course the vacuum level sufficient to prevent air penetration between the film and the parts must still be maintained through this process.

There are many different kinds and types of film on the market, each of which has its own liquid chemistry content with different boiling points, different adhesion levels verses temperature, different air solubility versus temperature, and so forth. Accordingly, it is impossible to specify a specific minimal vacuum level, temperatures, sticking levels, etc., for these many different films. However, those of ordinary skill in the art will appreciate this fact and will know the kind and type of film they are using and its liquid chemistry, and will thereby understand and be able to easily determine how the vacuum level must be decreased to prevent the boiling of liquid components other than water in their selected film while the film temperature rises to a final bonding temperature.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

We claim:

1. A method for laminating an assembled sandwich structure including a functional part and one glass article separated from an outer surface of the functional part by a laminating film, comprising:
    pre-laminating and bonding of the laminating film to the functional part and glass article in a vacuum by applying electromagnetic radiation from opposite sides of said sandwich by applying radiation from the glass article side at a radiation level which has a wavelength that provides penetration through the glass article, the film and half of the functional part, and applying radiation from the functional part side that has a wavelength that provides penetration greater than or equal to a second half of the functional part, selecting and controlling radiation powers for both of these radiation applications whereby a temperature of both surfaces of the functional part and the glass article are equal during heating, selecting the level of said vacuum to be a minimal value whereby the boiling point of water in the film is achieved during the radiation heating and the temperature is lower than the temperature at which said film sticks to the adjacent glass article and the functional part, and decreasing said minimal vacuum level to prevent the boiling of liquid components other than water contained in said film while the film temperature rises to a final bonding temperature level that is selected whereby an appropriate adhesion between said functional part, said laminating film, and said glass article is obtained after cooling; and
    cooling said sandwich structure from both sides whereby an equal temperature of both surfaces of the functional part is provided during the entire cooling process.

2. The method of claim 1, wherein cooling is provided until said sandwich temperature reduces to a selected safe level of around 70° C.

3. The method of claim 1, wherein said functional part is selected from a solar unit, a vacuum insulated unit, a polycarbonate sheet, a glass sheet, or a multi-glass article structure.

4. The method of claim 1, wherein said sandwich structure is provided with a glass article on both outer surfaces of the functional part.

5. The method of claim 1, wherein the radiation power selection is provided by adjusting a duty cycle thereof.

6. The method of claim 1, wherein the vacuum level is selected to be greater than 15 kPa.

7. The method of claim 1, wherein the wavelength of the radiation is selected to be between 1 and 5 microns.

8. The method of claim 1, wherein the pre-laminating and a final bonding are conducted in separate chambers.

9. The method of claim 1, wherein a final bonding is performed by a convectional heat source that is applied to both sides of said sandwich structure independently and controllably under normal pressure.

10. The method of claim 1, wherein the temperature of said sandwich structure at an end of the pre-laminating process is controlled to be sufficient to prevent a penetration of atmospheric air inside said sandwich structure after it moves to a next processing site for a final bonding.

11. The method of claim 10, wherein a film-glass adhesion produced at the end of the pre-laminating process is around 1000 N/mm2.

12. The method of claim 1, wherein the source of the electromagnetic radiation is selected from a sealed tungsten filament quartz lamp, a metal wire heating element, or a ceramic heater.

13. The method of claim 1, wherein said sandwich structure is oscillated during pre-laminating, bonding, and cooling.

14. The method of claim 1, wherein said radiation wavelength selection is provided by varying heater types.

15. The method of claim 1, wherein a change of said radiation wavelength is provided by varying filament temperature.

16. The method of claim 1, wherein the thickness of said functional part is selected to be different than the thickness of said glass article.

17. The method of claim 1, wherein said glass article is provided with a low-E coating on a side adjacent to a surface of the film.

* * * * *